Figure 1:
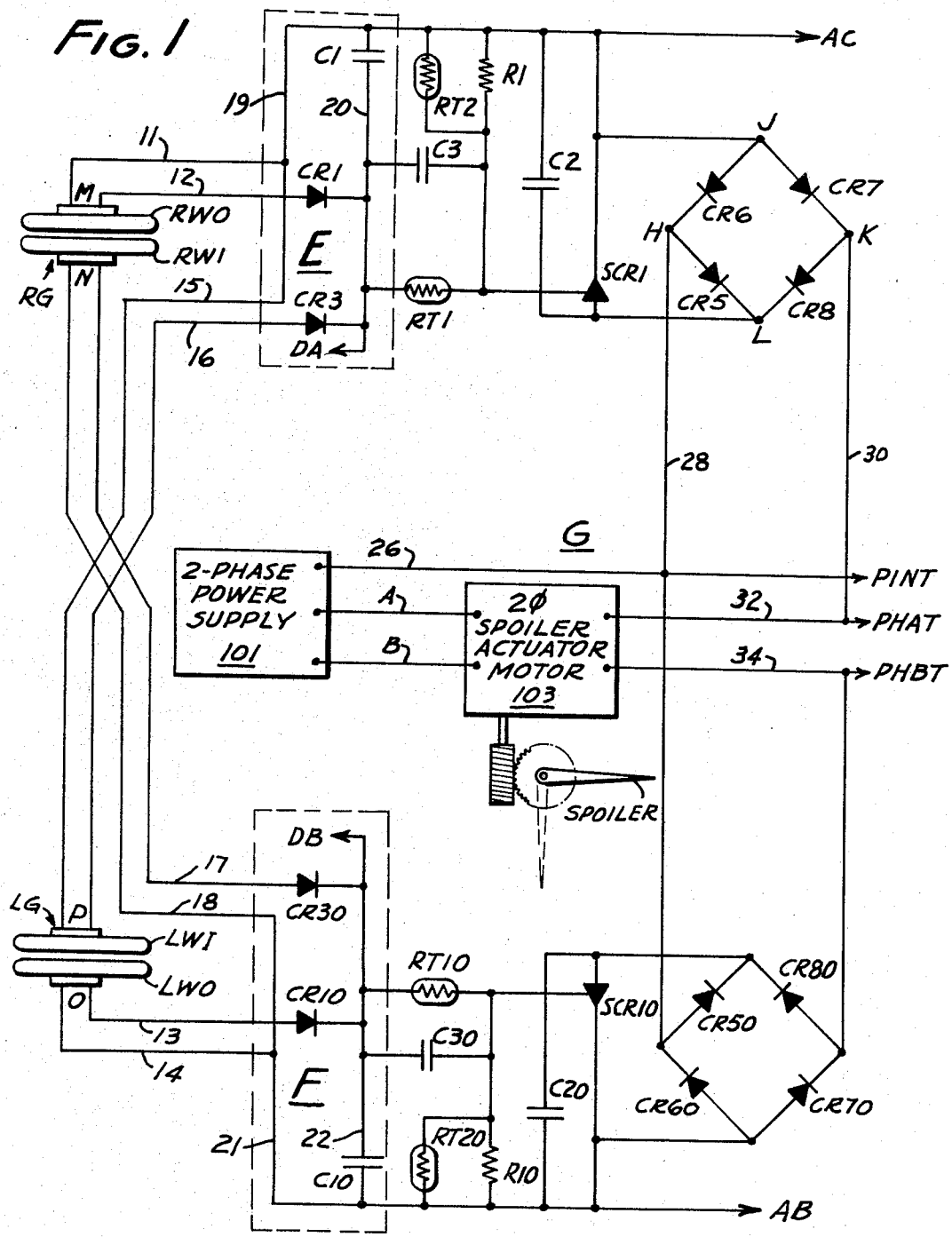

United States Patent Office 3,339,866
Patented Sept. 5, 1967

3,339,866
AIRCRAFT SPOILER ACTUATOR AND
CONTROL SYSTEM
Charles F. Paluka, Canoga Park, and Robert L. Bryant, Burbank, Calif., assignors to Crane Co., Chicago, Ill., a corporation of Illinois
Filed Oct. 23, 1965, Ser. No. 503,585
6 Claims. (Cl. 244—113)

This invention pertains to means for decelerating aircraft following touchdown of the craft upon a landing area; and more particularly to improvements in means for actuation of spoilers of aircraft.

Spoilers are devices utilized to interrupt or impede the otherwise relatively smooth flow of air past an aircraft whereby the speed of the craft is reduced. They are of value in reducing the distance traveled by the aircraft in coming to a stop or to ground-maneuvering speed following landing or touching down of the craft. Common forms of spoilers are hinged structures such as perforated plates or vanes which during flight may be retracted into positions in which they offer little or no drag or resistance to air flow and which following touchdown may be brought into position to offer considerable resistance to air flow and thus to aid in rapid deceleration of the craft. Movement of the spoilers into active spoiling position may be accomplished by manually operated means, by hydraulic means, or, as in the present invention, by motor-driven means such as motor-driven screw means.

In the interest of reducing the length of the landing run of the aircraft it is desired that the spoiler or spoilers be actuated, that is, brought into spoiling attitude, as promptly as is feasible following actual contact of the aircraft landing gear with the landing area, while making certain that spoiling does not occur until (a) both outboard wheels, or (b) both inboard wheels, or (c) inboard and outboard wheels on either side of the craft are rotating following engagement with the ground. In effecting manual initiation of spoiler actuation it is almost inevitable that time is lost between the time the operator becomes apprised of the actual ground-engagement and rolling progress of the craft and his initiation of spoiler actuation. Since during that period the aircraft is moving at the highest velocity portion of its landing run, it becomes evident that every second of delay of spoiler actuation following rolling contact greatly adds to the length of the landing run. It is the purpose of the invention to greatly minimize and to substantially eliminate the noted delay of spoiler actuation following rolling contact of load bearing wheels of the aircraft according to either of the aforementioned wheel rotation alternatives (a), (b) or (c), and to eliminate all possibility of premature actuation of the spoilers.

According to the invention wheel rotation is sensed or indicated by generation of an A.C. potential at the respective wheel by suitable means such as a permanent magnet alternator built into the wheel and hub structure. Any suitable A.C. generator driven by a respective wheel of the aircraft may be used as, for example, that disclosed in copending application Ser. No. 217,509, filed July 25, 1962, by Bernard B. Thompson and Donald J. O'Connell, and assigned to the same assignee as this application. The permanent magnet means comprised in the rotor rotate with the wheel and the field coils are stationary and are supported from the hub structure. The mechanical structures may take a variety of forms depending upon the wheel and hub structure of the craft and since they are in accord with well known electromechanical design are not herein shown in detail. As is conventional in alternators, the frequency and potential generated by any of the alternators (one in each wheel) are both substantially proportional to the rotational speed of the respective wheel within the wheel speed range here of interest. Means are provided according to the invention whereby initiation of spoiler actuation cannot occur until one or the other of the alternative wheel rotation conditions is attained. Thereafter, due to electronic sensing or detection of attainment of an acceptable wheel rotation condition, spoiler actuation is substantially instantaneously initiated. A two-phase motor is employed to actuate the spoiler, and control means are provided whereby one phase of the motor power is supplied in response to detection of a first of the two operational characteristics of either of the alternative wheel rotation conditions, and the other phase of the power is supplied in response to detection of the second of the two necessary concurrent operational characteristics of wheel rotation. Since the motor cannot operate on power of either phase alone but will operate only when power of both phases is supplied, premature initiation of spoiler actuation is positively prevented.

The previous brief general discussion and description of the invention makes it evident that it is a principal object of the invention to provide improvements in spoiler-actuating systems for aircraft.

Another object of the invention is to provide an automatically operable spoiler-actuating system for aircraft which cannot be prematurely operated and which will actuate a spoiler at the earliest practicable time during landing of the aircraft.

Other objects and advantages of the invention are made evident or stated in the appended claims and in the following description of a preferred form of the invention which is schematically illustrated in the accompanying drawings forming a part of this specification.

Figure 2:
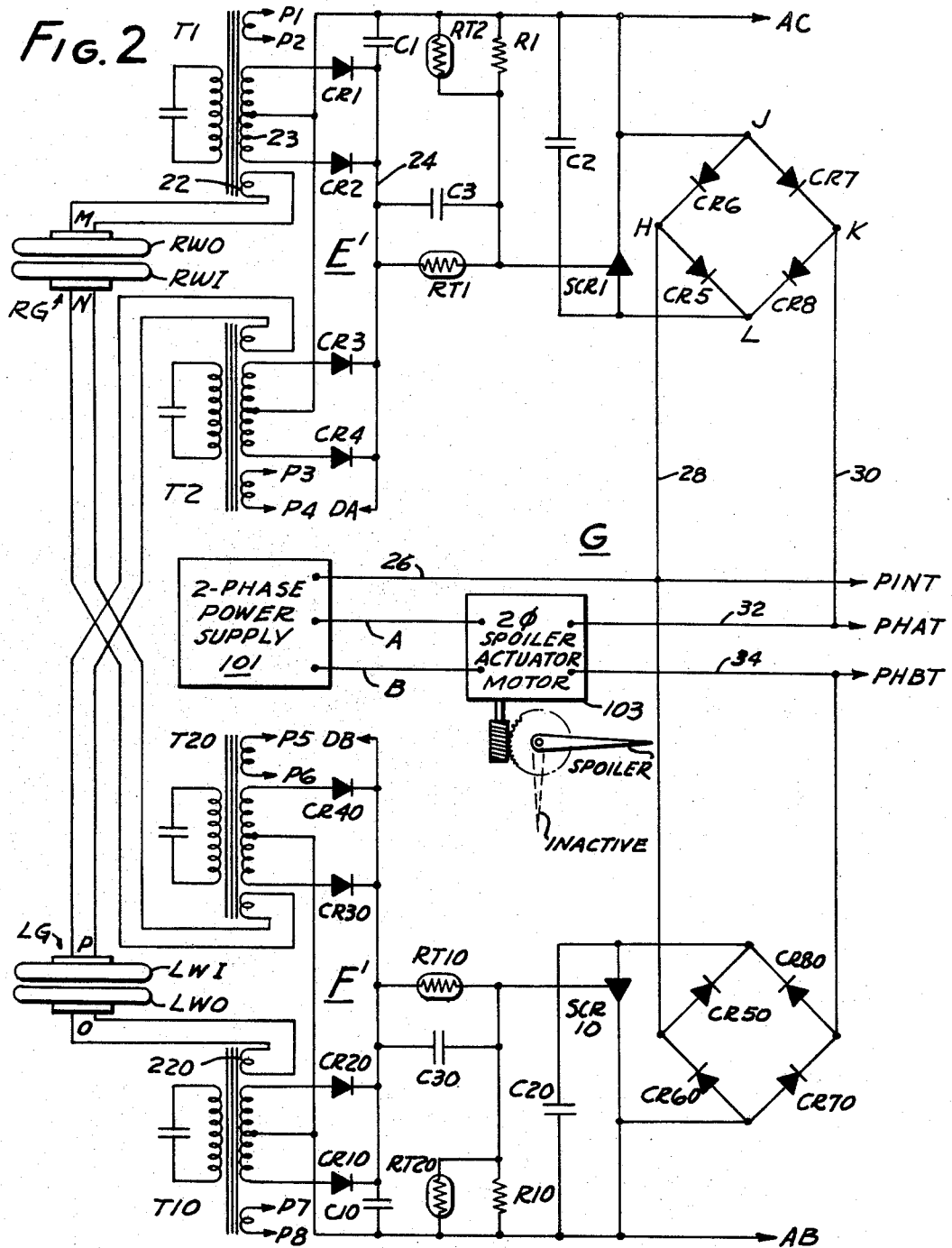

In the drawings:

FIGURE 1 is a schematic circuit diagram depicting the functional interconnection of components of the preferred embodiment of the invention and showing electric circuit interconnections; and FIGURE 2 is a schematic circuit diagram similar to FIGURE 1 but depicting a circuit using a different form of logical "or" gate means.

In each of the drawings there are represented right and left landing gear units RG and LG, respectively, each comprising an outboard wheel unit and an inboard wheel unit. The unit RG thus comprises an outboard wheel and permanent magnet alternator collectively labeled RWO (right landing gear outboard wheel or wheel unit), with similar wheel and alternator combinations RWI (right landing gear inboard wheel or wheel unit), LWI and LWO. Each alternator is represented in the drawing by a hub adjacent to the respective wheel, and has a pair of output conductors or leads as indicated. Each alternator generates A.C. potential of frequency and potential substantially linearly proportional to rotational speed of the associated wheel, as previously was noted.

Potential M generated by unit RWO is applied by way of conductors 11 and 12 to a logical "or" means denoted by the letter E and shown as enclosed in a dash-line rectangle. Thus conductor 11 is connected to one lead 19, extending as indicated; and conductor 12 is connected, via a rectifier CR1, to a second lead 20. Thus if potential M is produced by rotation of wheel RWO, a potential will be exhibited between leads 19 and 20, and across a capacitor C1 connected between the leads as shown. In similar fashion, when wheel LWO rotates, potential O is generated and is evidenced across conductors 13 and 14; and that potential is applied to a second logical "or" means denoted by the letter F and demarked by a dash-line rectangle. Thus the conductor 14 is connected to a lead 21, and conductor 13 is connected via a rectifier CR10 to a second lead 22, as indicated. Thus when potential O is generated, a potential is produced across a capacitor C10 connected between leads 21 and 22.

Similarly, a potential P is generated when wheel LWI rotates, and such potential, appearing across conductors 15 and 16, is applied to the first logical "or" circuit leads 19 and 20 by way of the direct connection of conductor 15 to lead 19 and the connection of conductor 16 to lead 20 by way of a rectifier CR3. Also, and similarly, a potential N is generated across conductors 17 and 18 when wheel RWI rotates, and that potential causes appearance of a potential across leads 21 and 22 of the second logical "or" circuit by way of the direct connection of conductor 18 to lead 21 and the connection of conductor 17 to lead 22 via a rectifier CR30. It will be noted, considering for example the "or" circuit E, that appearance of either of potentials M or P on conductors 19 and 20 will cause back-biasing of the inactive one of the two rectifiers CR1 and CR3, so that the circuit acts as a true logical "or" gate. In general, the first of the two possible potentials (M and P) to appear will energize the circuit.

From the preceding description it is evident that a potential is exhibited across the leads 19 and 20 of the first logical "or" means E in the event of rotation of wheel RWO, or of rotation of wheel LWI, or rotation of both of those wheels. Similarly, a potential will appear across the leads 21 and 22 of the second logical "or" means F in the event of rotation of wheel LWO, or rotation of wheel RWI, or both of those wheels. Also, it is evident that both of the logical means E and F will be energized if (a) all wheels rotate, (b) both outboard wheels rotate, or (c) both inboard wheels rotate; but that both of the logical means will not be energized if (a) none of the wheels rotate, or (b) only an outboard wheel on one side and an inboard wheel on the other side rotate.

According to the invention, spoiler means will be operated only when both of the logical "or" means are energized as above indicated. Thus control means which in effect constitute a logical "and" means are provided which utilize as inputs respective signals provided by the two means E and F when the latter are energized and which require the presence of both such signals (as is usual in logical "and" devices) before spoiler actuation is initiated. The noted control means comprise two substantially identical circuits, and accordingly, the detailed description will be restricted to only that depicted at the top of FIGURE 1 with only such reference to the mirror-image or twin circuit (shown at the bottom of the figure) as may be required.

The potential made apparent across leads 19 and 20 of circuit E is pulsating, due to rectification by the rectifier (CR1 or CR3) of the A.C. wave generated at the wheel. The pulsing D.C. potential or signal appearing on leads 19 and 20 is employed to initiate supply of a first phase of two-phase A.C. power to a two-phase motor used to actuate the spoiler. Supply of the other phase of A.C. power is similarly initiated by the noted "twin" control circuit rendered active by an output signal from logical means F and depicted at the lower part of FIGURE 1.

The pulsating D.C. potential appearing on leads 19 and 20 is filtered or smoothed by capacitor C1 and a resistor R1 connected as shown, and the resultant signal is applied by way of temperature-sensitive resistor RT1 to the gate of a silicon controlled rectifier SCR1. Since the circuits are subject to wide variation of ambient temperature during aircraft operation, the circuits are "temperature-corrected" by use of a temperature variable resistor RT2 connected in parallel with resistor R1, and by use of a temperature-variable resistor at RT1.

The D.C. potential applied to the gate of control rectifier SCR1 renders that rectifier conductive, and thus when SCR1 is so triggered, the first phase (A) of two-phase electric power from a power supply unit 101 is supplied via power supply common lead 26, lead 28 to junction H of a rectifier bridge comprising rectifiers CR5, CR6, CR7 and CR8, thence via CR5, junction L, SCR1, junction J, rectifier CR7, junction K and leads 30 and 32 to the two-phase spoiler actuator motor 103, during alternate half-cycles, and is supplied via leads 32, 30, junction K, CR8, junction L, SCR1, junction J, CR6 and lead 28 and 26 during the intervening half-cycles. The two-phase motor 103 will not operate with power of only one phase supplied, however, and the noted mirror image logical gate and single-phase power supply control circuit depicted at the bottom of the drawing is provided to supply the second phase (B) of power, contingent upon generation of, alternatively, potential N from wheel unit RWI, or, potential O from wheel unit LWO.

The mirror-image circuits and components depicted at the lower part of the drawing operate identically the same as do the corresponding elements at the upper part of the drawing and previously described; however rectifier bridge comprising CR50, CR60, CR70 and CR80 is connected, as shown, across power supply common line 26 and the phase B line 34 to motor 103.

Thus it is seen that the control circuitry comprising the silicon controlled rectifiers SCR1–SCR10 and the rectifier bridge networks, in combination with the two-phase power supply and motor 103 effectively perform as a logical "and" unit, there being no motor output or spoiler action in the absence of the supply of power of phase A and concurrent supply of power of phase B. Also it is evident that spoiler operation is positively precluded until one or the other of the potential signal combinations MN, or OP, or NP or MO is produced, that is, unless both outboard wheels are rotating, of both inboard wheels, or both the outboard and inboard wheels at either side. The logical "or" gates or means E and F, with the associated full-wave rectifier nets such as CR1–CR2 and CR3–CR4, serve as logical "or" gates which are connected into the logical "and" gate comprising the pair of silicon controlled rectifier and rectifier-bridge circuits. Since actuation of the spoiler by operation of motor 103 has been denoted by the logical equation symbol "X", it is seen the Boolean or logical equation $X=AB$ (read X equals $A$ and $B$ and fuctionally representing that the spoiler actuator motor will operate to actuate the spoiler when phase A power *and* phase B power is supplied), defines the two-phase power supply and control operation of the circuits when A represents the supply of power of phase A and B represents the supply of power of phase B to motor 103. Since presence of a gating signal at the gate of rectifier SCR1 is the operational equivalent of supply of phase A power, and similarly presence of a gating signal on the gate of rectifier SCR10 is the operational equivalent of supply of phase B power, those signals may be represented by A and B, respectively. That being the case, the logical equation $A=M+P$ (read A equals M or P, and meaning signal A occurs when either of signals M or P occurs (can be written and will logically define the functional supply of power of phase A. Similarly, in the case of the supply of phase B power, the logical equation $B=N+O$ applies.

Substituting in the logical equation $X=AB$ the values $A=M+P$ and $B=N+O$;
$$X=(M+P)(N+P)$$
and, expanding:
$$X=MN+MO+PN+PO$$

which may be read X equals M and N, or M and O, or P and N, or P and O, and which is functionally interpreted to mean that motor 103 will operate when signals M *and* N are concurrently produced, *or* M *and* O are produced, *or* P *and* N are produced, *or* P *and* O are produced. Referring to the left hand portion of the drawing and relating the functional interpretation to wheel rotation, it is evident that the spoiler will be actuated (a) when both the right and left outboard wheels rotate, or (b) when both the right and left inboard wheels rotate, or (c) when both inboard and outboard wheels of either the right or left wheel units rotate. Further, it will be noted that in the event of the right outboard and the left inboard wheels rotating, or the right inboard and left outboard wheels rotating, in the absence of other wheels rotating, power of one or the other of phases A and B will not be supplied and the spoiler will not be actuated. In Boolean representation:

$$MP = A;\ N'O' = B'$$

and $$NO = B;\ M'P' = A'$$

which means that in the first event or case, power of phase A is supplied but power of phase B is not supplied; and in the second event or case, power of phase B is supplied but power of phase A is not supplied. This is clearly evident when it is noted that with only wheels RWO and LWI rotating only rectifiers CR1 and CR3 are active and there are no signals supplied to either of transformers T10 and T20 in the first case, and that in the second case signals N and O are supplied to rectifiers CR10 and CR30 to cause supply of power of phase B but neither of signals M and P is produced so that supply of power of phase A is not initiated.

From the preceding it is evident that by utilizing separate signal-producing devices at each of the outboard and inboard wheel units and utilizing the signals in a pair of "or" gate means represented generally by E and F, respectively on the drawing, and in the manner stated, and utilizing signals from the two "or" gate means as inputs to "and" gate means represented generally by G on the drawing, and effecting spoiler actuation in response to an output from the "and" gate means only, substantially instantaneous spoiler actuation is effected at the earliest practicable moment during landing of the aircraft and premature actuation is positively precluded and further that spoiler actuation will not and cannot be effected in those cases of wheel operation noted wherein spoiler operation is undesirable.

Connections and means are provided in the system whereby tests of the circuitry may be performed while the aircraft is at rest on the ground or in normal flight. Thus provisions are made for energizing the control circuits with suitable A.C. energy as artificial signals in lieu of signals from the "or" gates. Also, production of control signals for the respective phases may be tested. Thus by means of connections indicated at AC and DA in the phase A control circuit, pulsing D.C. or A.C. may be applied to test the phase A control circuitry; and the supply of phase A power to motor 103 may be tested via connections PINT (power in test) and PHAT (phase A test). Similarly, testing in respect of the second logical "or" or control circuit may be effected by way of connections AB and DB; and supply of phase B power to motor 103 may be tested by way of connections PINT and PHBT.

In FIGURE 2 there is depicted circuitry similar to that shown in FIGURE 1 and previously herein described, but utilizing a form of logical "or" means in which complete electrical isolation of the "or" circuit input and output signals and circuits is accomplished. Such isolation in some instances is desirable. Referring to FIGURE 2, potential M generated by unit RWO is supplied to the primary 22 of a tuned transformer T1 as indicated; and similarly the A.C. potential N generated by unit RWI is supplied to the primary of a like transformer T20 as indicated, either event being conditioned upon rotation of the respective wheel. In a similar way by similar means, potential 0 from unit LWO is supplied to the primary 22 of a third like transformer T10, and potential from LWI is supplied to the primary of a fourth transformer T2. As is made evident in the drawing, transformers T1 and T2 are paired, and transformers T10 and T20 are similarly paired. The two sets of transformer pairs are connected to operate into substantially similar circuits, one at the top of the drawing and the other (shown as a mirror image of the first) at the bottom of the drawing. Functional operation of either of the noted circuits being the same, detailed description thereof will be restricted principally to the first or upper circuit.

Energization of the primary 22, transformer T1, generates A.C. potential in the other windings linked to the core of T1, and when the frequency of the signal potential M nears the resonance frequency of the tuned secondary circuit, the potential generated in the center-tapped secondary 23 rapidly increases to a useful value. The transformer output potential is connected for full-wave rectification by rectifiers CR1 and CR2 and will appear across capacitor C1 if rectified. Similarly, the signal or potential P from unit LWI energizes transformer T2 and output potential generated in the center-tapped secondary is presented for full-wave rectification via rectifiers CR3 and CR4 and if rectified will appear on line 24 and across capacitor C1. Since either of the output potentials from T1 and T2 may appear first, or be of greater amplitude than the other, that which appears first or is at the moment highest will be rectified and, appearing across C1, will bias the other rectifier net against conduction. Thus the transformer-rectifier set or pair just described functions as a logical "or" gate (denoted E' in the drawing), passing a signal to line 24 that represents potential M, or alternatively represents potential P, but never both. That is, the signal, which may be called A, is such that in Boolean algebra or logical notation conforms to the logical equation $A = M + P$ which is read "A is active when M is active or when P is active." Thus the transformer-rectifier units described conform to the requisites of a logical "or" gate.

The signal supplied by the logical "or" gate E' just described appears as a pulsing D.C. potential signal on common conductor 24 and across capacitor C1. It is the product or result of the full-wave rectification accomplished by the active one of the rectifier nets. That signal is employed to initiate supply of a first phase of two-phase A.C. power to the two-phase motor used as the spoiler actuator, in a manner hereinbefore made evident in the description relative to FIGURE 1. In other respects, the operations of the lower half (second control circuit) of the circuitry of FIGURE 2 is the same as that of the first (upper) control circuit, and is effective in an evident manner to control supply of phase B power to motor 103. The operation of the two control circuits and the two-phase motor as a logical "and" means is substantially the same as in the case of the circuitry of FIGURE 1.

Connections and means are provided in the system whereby tests of the circuitry may be performed while the aircraft is at rest on the ground or in normal flight. Thus provisions are made for energizing the tuned transformers by way of A.C. excitation supplied to auxiliary primary windings via leads P1–P2, P3–P4, P5–P6, and P7–P8, respectively; and thus artificial signals injected into the "or" gate means. Also, by means of connections indicated at AB–DB and AC–DA production of control signals for the respective phases may be tested, and the supply of either phase of power to the motor may be tested via connections PINT (power in test), PHAT (phase A test) and PHBT (phase B test).

In the drawings, conventional symbols are employed to represent electronic components. While solid-state rectifiers are represented, it is evident that other types of rectifiers may be employed in the exemplary circuits. Further, while for convenience, among other reasons, specific means such as tuned transformers and full-wave rectifiers, or simple rectifiers, are used as logical or gate means, and while similarly twin silicon controlled rectifier and rectifier bridge means in combination with a two phase motor are used as logical and gate means, it is evident that other equivalent logical "or" and "and" gate means, compatible with wheel-controlled signal supplying means and with spoiler-actuator means, respectively, may be used.

While the particular aircraft spoiler actuator and control system herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. An aircraft spoiler actuator system comprising: first means, including first, second, third and fourth individual signal-supplying means for right outboard and inboard wheels and left inboard and outboard wheels, respectively, said signal supplying means being individually responsive to rotation of the respective wheel only to supply a signal representing rotation of the respective wheel; second means, connected to said first means, including first logical "or" gate means connected to receive signals supplied by said first and third signal-supplying means and effective only in response to reception of a signal from either thereof to provide a first control signal, said second means further including second logical "or" gate means connected to receive signals supplied by said second and fourth signal-supplying means and effective only in response to reception of a signal from either thereof to provide a second control signal; and third means, connected to said second means, including means effective to act as logical "and" gate means and including therein spoiler-actuating means effective only in response to concurrent reception of both first and second control signals from said first and second logical "or" means to effect operation of said spoiler actuating means.

2. An aircraft spoiler actuator system for an aircraft having right and left outboard load bearing wheels and right and left inboard load bearing wheels and in which a spoiler is moved from inactive position into active position to brake forward motion of the aircraft, said system comprising in combination with such spoiler: first, second, third and fourth signal generators operated only in response to rotation of right outboard, right inboard, left inboard and left outboard aircraft load-bearing wheels, respectively; first logical "or" gate means connected to said first and third signal generators to receive signals generated by the latter and effective to produce a first control signal in response to reception of a signal from either thereof; second logical "or" gate means connected to said second and fourth signal generators to receive signals generated by the latter and effective to produce a second control signal in response to reception of a signal from either thereof; and controlling means, including spoiler actuating means with means effectively acting as logical "and" gate means, connected to said first and second logical or gate means for reception of signals produced thereby and effective only in response to concurrent reception of both a said first control signal and a said second control signal to actuate the spoiler to cause movement of the latter from inactive position to active position, whereby spoiler actuation can occur only incident to concurrent operation of, alternatively, both outboard wheels, both inboard wheels, or both the outboard and inboard wheels at either the right or the left side of the aircraft and is prohibited under all other conditions.

3. A system according to claim 2 in which said first, second, third and fourth signal generators are individual A.C. wave generators at respective ones of the aircraft wheels, and in which said first logical "or" gate means comprises first and second circuits each comprising a tuned transformer and a full-wave rectifier unit with means connecting the two rectifier units to a common line, and in which second logical "or" gate means is a duplicate of said first logical "or" gate means.

4. A system according to claim 2, in which said controlling means comprises first and second control circuits each comprising a silicon controlled rectifier connected to be rendered conductive in response to reception of a respective one of said first and second control signals and each further comprising means rendered effective in response to conduction by the respective silicon controlled rectifier to supply a respective one of first and second phases of two-phase A.C. power and said controlling means comprising two-phase A.C. motor means connected to utilize said first and second phases of two-phase A.C. power and mechanically effective to actuate the spoiler only in response to supply of power of both of said first and second phases.

5. A system according to claim 2 in which said first, second, third and fourth signal generators are individual A.C. wave generators at respective ones of the aircraft wheels, and in which said first logical "or" gate means comprises first and second circuits each comprising a tuned transformer and a full wave rectifier unit with means connecting the two rectifier units to a common line, and in which second logical "or" gate means is a duplicate of said first logical "or" gate means, and in which system said controlling means comprises first and second control circuits each comprising a silicon controlled rectifier connected to be rendered conductive in response to reception of a respective one of said first and second control signals and each further comprising means rendered effective in response to conduction by the respective silicon controlled rectifier to supply a respective one of first and second phases of two-phase A.C. power and said controlling means comprising two-phase A.C. motor means connected to utilize said first and second phases of two-phase A.C. power and mechanically effective to actuate the spoiler only in response to supply thereto of power of both said first and second phases.

6. A system according to claim 5, in which the connection to either of said silicon controlled rectifiers for reception thereby of a respective one of said first and second control signals includes temperature-variation corrective means including temperature-responsive resistor means.

References Cited
UNITED STATES PATENTS 2,788,186   4/1957   Wilson _____ 244—111

MILTON BUCHLER, *Primary Examiner.*

P. E. SAUBERER, *Assistant Examiner.*